Sept. 9, 1969 E. P. HAUSERMANN 3,465,480
APPARATUS FOR SHAPING ELECTRODES
Filed March 13, 1967 2 Sheets-Sheet 2

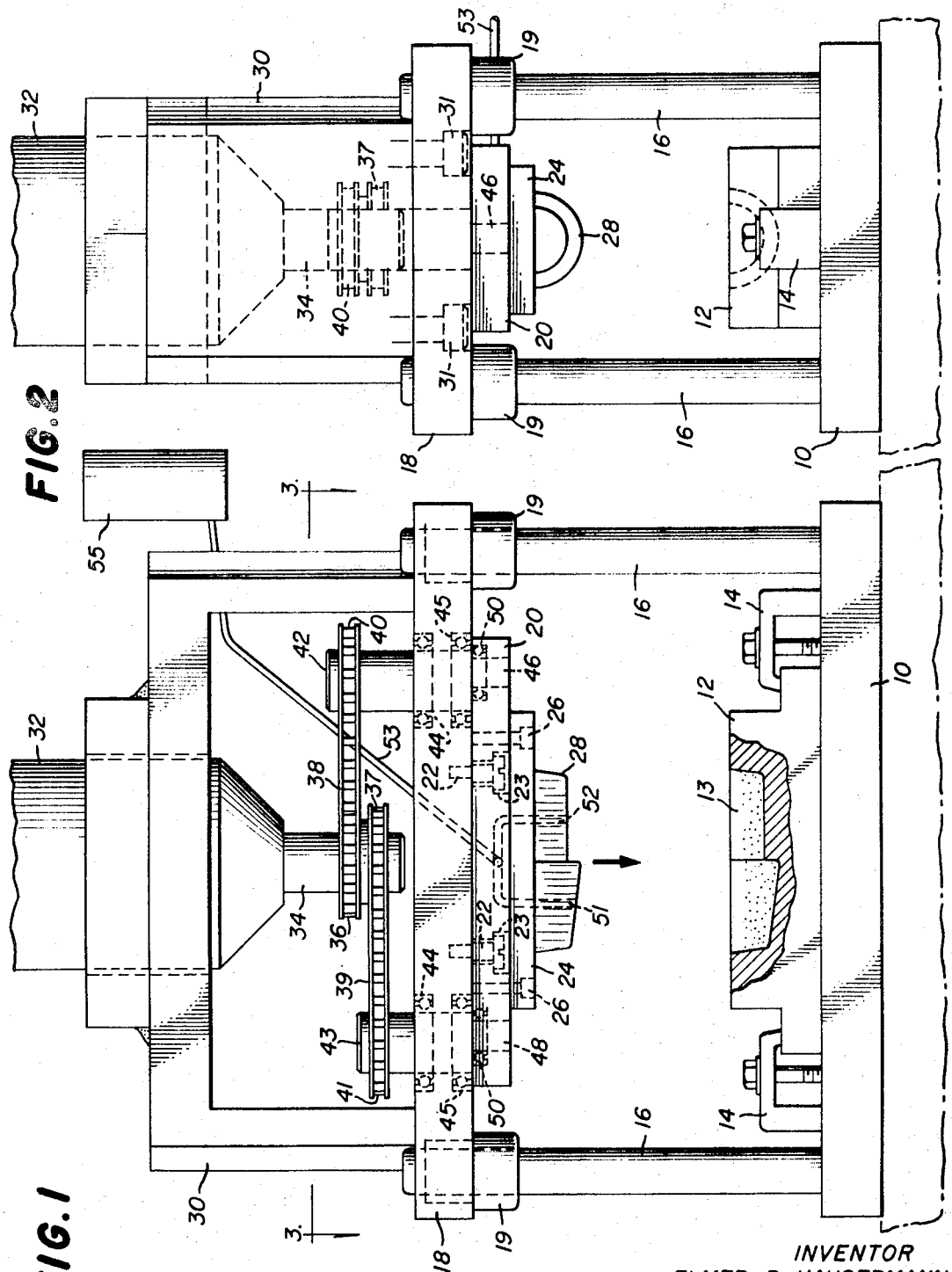

INVENTOR
ELMER P. HAUSERMANN
BY
ATTY.

United States Patent Office 3,465,480
Patented Sept. 9, 1969

3,465,480
APPARATUS FOR SHAPING ELECTRODES
Elmer P. Hausermann, 4N, 224 Hawthorne,
Bensenville, Ill. 60106
Filed Mar. 13, 1967, Ser. No. 622,532
Int. Cl. B24b 7/00, 9/00, 25/00
U.S. Cl. 51—157                                    5 Claims

ABSTRACT OF THE DISCLOSURE

Apparatus for shaping electrodes comprising an abrasive die cavity into which an electrode workpiece is forced and wherein an oscillatory motion is given either the workpiece or the die cavity to thereby form the workpiece into the identical shape and contour of the die member.

BACKGROUND

Prior to this invention, die members for forging, molding plastic parts, punch press dies and the like, were obtained either by milling the die cavity out of a piece of steel stock or by burning the die cavity by electrical discharge machining. Preparing a die cavity by milling was relatively uneconomical due to the inordinate amount of time and skilled labor required to make a die member containing all of the proper tolerances.

It was found that die members for preparing parts could be constructed by electrical discharge machining with substantial savings in time and skilled labor over that normally required to mill and finish die cavities.

Obtaining a die member by electrical discharge machining required the machining of a model of the same construction as that of the part to be formed and thereafter using this model as a pattern in the preparation of electrical discharge machining electrodes. The electrodes were normally cut from an electrically conductive workpiece such as copper, silver, platinum, carbon or the like. The shaped electrodes were then used to burn out the die cavity for forming parts. Normally, when carbon was used, about four electrodes were expended in the production of one die cavity.

The electrical discharge machining electrodes were, of necessity, perfectly constructed in order to prepare the die cavity within prescribed tolerance limits. Prior to this invention, the electrical discharge machining electrodes were normally bench finished after being milled or machined from a workpiece. Bench finishing required that all of the mill marks and other imperfections be removed with emery cloth, sandpaper, files, or other abrasive implements to prepare a perfect electrode for use in burning the die cavity. The milling and bench working of the electrode required a substantial amount of manual labor by a skilled craftsman.

SUMMARY OF THE INVENTION

Briefly described, the present invention is directed to an apparatus for automatically forming intricately designed electrical discharge machining electrodes. The method and apparatus of this invention obviates the necessity of bench working electrodes and also may be used to form the electrodes from a blank workpiece. If the apparatus is used to finish the electrodes, i.e., bench finish the electrodes, the electrodes will have been previously roughed out by milling or machining.

The use of this invention for forming or bench finishing electrical discharge machining electrodes involves the steps of forming a die cavity member and mounting it on a platen, preparing a rough workpiece member of an electrical conductive material of the general shape of the required electrical discharge electrode, mounting this workpiece member on a second platen in registered superposed working relation to the die member on the first platen, and forcing the workpiece member into the die cavity while subjecting at least one of the members to oscillatory rotary motion to thereby form the workpiece into the identical shape and contour of the die member.

The apparatus for forming or bench finishing electrodes in accordance with this invention is comprised of a first platen and a second platen mounted in superposed relation to the first platen. One of the platens is provided with a die member with an abrasive surface thereon mounted on the first platen and the second platen is provided with an electrical discharge machining electrode workpiece member mounted thereon in working alignment with the die member means. There are means for applying oscillatory rotary motion to at least one of the platens as well as means for bringing the electrode member and die member into contact with each other while oscillatory rotary motion is applied to at least one of the members. In this manner, the electrode workpiece member is formed to the same shape and contour as the die member.

This invention will be more fully understood from the following description of the drawings in which:

FIGURE 1 is a front elevation of the apparatus of this invention;

FIGURE 2 is a side elevation of the apparatus of this invention;

Figure 3:
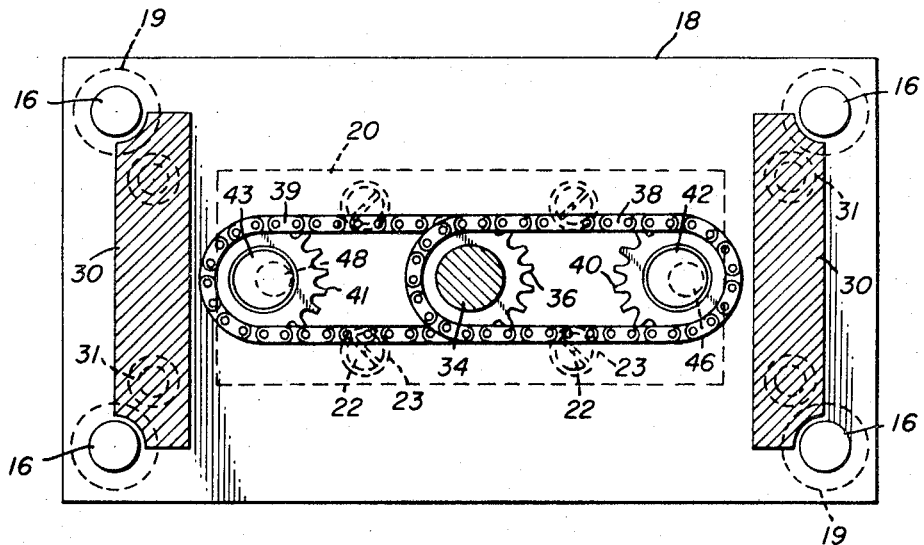
FIGURE 3 is a cross-sectional view taken on lines 3—3 of FIGURE 1.
Figure 4:
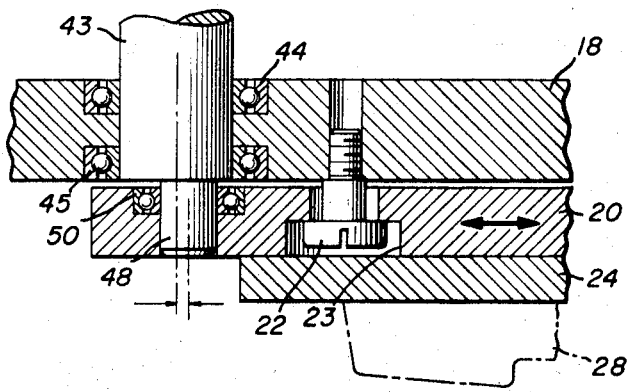
FIGURE 4 is an enlarged fragmentary cross-sectional view of the mounting plate on the upper platen of the apparatus shown in FIGURE 1.

Referring more particularly to the drawings, FIGURE 1 shows a front elevation of a complete apparatus illustrating one manner of utilizing this invention. As shown, there is a base platen 10 on which a die member 12 is mounted by adjustable clamps 14. Die member 12 is provided with an abrasive surface 13 which will be described in detail in conjunction with alternative embodiments thereof.

There are four guide members 16 mounted on base platen 10 which serve as sliding guides for upper platen 18 which is mounted for movement on guides 16 by guide bushings 19.

Upper platen 18 retains a drive member plate 20 on its lower surface by means of bolts 22. Drive plate 20 includes oversize mounting holes 23 to allow for movement and mounting of plate 20 with respect to platen 18.

The drive member plate 20 has electrical discharge machining electrode workpiece mounting members 24 mounted thereon by bolts which fit in bolt holes 26. The mounting member 24 may be an integral part of electrical discharge machining workpiece 28.

Mounted above platen 18 is a frame 30 which encloses a milling machine head 32 which is vertically adjustable as is well known in the art. Frame 30 is attached to platen 18 by bolts 31 (FIGURE 2). Milling machine head 32 is provided with a spindle 34 extending downwardly therefrom, which spindle 34 carries sprockets 36 and 37 at the end thereof.

A chain 38 extends around sprocket 36 on spindle 34 and a second sprocket 40 mounted on shaft 42 to the right of spindle 34 as shown in FIGURE 1.

A chain 39 extends around sprocket 37 and a second sprocket 41 on a shaft 43 to the left of spindle 34. Shaft 42 to the right of spindle 34 and shaft 43 to the left of spindle 34 extend through platen 18 and are retained within bearings 44 on the upper surface of platen 18 and bearings 45 on the lower surface of platen 18. Shaft 42 is provided with a shaft extension 46 that extends through drive plate 20, which extension 46 has a centerline offset from the centerline of shaft 42. Shaft extension 48 of shaft 43 extends through drive plate 20 and has a centerline offset from the centerline of shaft 43. The offset in shaft extensions 46 and 48 are equal to each other as will be understood from a reading of the description of the operation of the apparatus. Shaft extensions 46 and 48 are retained within bearings 50 on the upper surface of drive plate 20.

As shown, there are two vertical holes 51 and 52 (shown in broken outline in electrode workpiece 28) which are connected with conduit 53. Conduit 53 serves to join a solvent source, shown as tank 55, with workpiece 28. Those parts set forth in the drawings will be described in conjunction with the operation thereof.

Operation

To form an electrical discharge machining electrode in accordance with this invention, a die 12 is placed on lower platen 10 and adjusted thereon by adjusting clamps 14. The die 12 may be a steel die cavity, silicate agglomerate, plastic agglomerate or the like. In any case, the die 12 is provided with an abrasive surface 13. If the die cavity is steel, the abrasive surface may be obtained by overburning on an electrical discharge machine. If the die is a silicate agglomerate, the surface may be sufficiently rough without requiring additives. If a plastic material is used, the addition of sand or silicone carbide may be used to form an abrasive surface.

An electrical discharge machining electrode workpiece 28 is mounted on mounting plate 24 attached to movable member 20. It should be understood that the position of the die member and the electrical discharge machining electrode workpiece 28 may be reversed if desired. The electrode workpiece 28 is shown to be stationary and not adjustable as is die member 12, therefore, the die member 12 is adjusted by clamps 14 to place the die member and electrode workpiece 28 in working alignment with each other.

The vertically adjustable milling machine head 32 is actuated, which rotates spindle 34 carrying sprockets 36 and 37. Rotation of sprockets 36 and 37 actuates chains 38 and 39 which in turn, rotates shafts 42 and 43 via sprockets 40 and 41 mounted thereon. As mentioned, the shaft extensions 46 and 48 have centers that are offset from the center of shafts 42 and 43 and when shafts 42 and 43 are rotated, plate 20 undergoes an oscillatory rotary motion. By oscillatory rotary motion, it is meant that the outer periphery of mounting member plate 20 does not spin around the center point of the plate, but that any given point on the plate undergoes a reciprocating type of circular motion equal to the offset of shaft extensions 46 and 48. This circumferential motion with respect to any point on member 20 is herein referred to as oscillatory rotary motion.

The amount of oscillatory rotary motion to which movable plate 20 is subjected in the figures is fixed by virtue of the offset on shaft extensions 46 and 48 which are integral portions of shafts 42 and 43 respectively. The offset of the extensions may be varied by constructing these extensions as separate adjustable units. When the extensions are separate adjustable parts, the amount of motion to which plate 20 is subjected may be varied without requiring the removal of shafts 42 and 43.

As shown, the oscillatory rotary motion transmitted to mounting member 20 results in electrode workpiece undergoing the same motion as that of mounting member 20 and each point on the electrode workpiece moves within the same circumference as the amount of offset on shaft extensions 46 and 48.

While the oscillatory rotary motion is applied to workpiece 28, it is lowered into die 12 by lowering vertically adjustable milling machine head 32. During that period that the electrode is in contact with die 12, abrading of the electrode 28 takes place to cause electrode 28 to seek the form of die 12. The electrode is kept in contact with the die 12 for short periods of time and then removed while a solvent from tank 54 is passed via conduit 52 and holes 50 and 51 in electrode 28 into die 12 to flush out those particles abraded from electrode 28 which particles were formed while electrode 28 and die 12 were in contact with one another. The type of solvent used to flush out particles depends on the kind of material from which the electrode is constructed and may vary over a wide range from water to a hydrocarbon solvent such as alcohol or kerosene. It has been found that both the aliphatic and aromatic solvents such as alcohol, kerosene, benzene, toluene and the like are preferred when carbon electrodes are being formed.

As mentioned, the electrode formed in accordance with this invention may be initiated from either a crude workpiece block or a milled workpiece having the milling marks thereon and only requiring bench work. In either case, the invention provides an electrode free of imperfections, free of mill marks and within the prescribed tolerances for electrical discharge machining use.

The speed at which the spindle is driven on the above described apparatus may vary from ten revolutions per minute to a thousand or more and the speed will depend on the kind of material used in construction of the electrical discharge machining electrode.

It will be understood that while the invention has been described in connection with certain specific embodiments thereof, that this is by way of illustration and not by way of limitation and that the scope of the invention is defined solely by the appended claims which should be construed as broadly as is consistent with the prior art.

I claim:

1. An apparatus for forming electrical discharge machining electrodes comprised of:

a first platen;

a second platen mounted in superimposed relation to said first platen;

a die member having an abrasive surface mounted on one of said platens;

a workpiece mounting member mounted on that platen opposite the platen on which said die member is mounted and in working alignment with said die member; said workpiece member adapted to hold an electrical discharge machining electrode workpiece;

means for applying oscillatory rotary motion to at least one of said members mounted on said platens; and vertically adjusting means for bringing said workpiece mounting member and said master die member into contact with each other while oscillatory rotary motion is being applied to at least one of said members to cause said workpiece to seek the form of said master die member.

2. The apparatus of claim 1 wherein there are means for applying solvent to said die member while contacting said members with each other under oscillatory rotary motion to thereby remove any particles within said die member.

3. The apparatus of claim 1 wherein the oscillatory rotary motion is adapted to be applied to said electrical discharge machining electrode and said die member is adapted to remain stationary.

4. The apparatus of claim 1 wherein said electrical discharge machining electrode workpiece mounting member is adapted to receive an electrically conductive material selected from the group consisting of carbon, silver, copper, platinum and the like and the die member is steel with an abrasive surface formed thereon by overburning said surface on an electrical discharge machine.

5. The apparatus of claim 1 wherein milling machine means are utilized to apply oscillatory rotary motion to one of said members mounted on said platens.

References Cited

UNITED STATES PATENTS

| | | | |
|---|---|---|---|
| 512,012 | 1/1894 | Delano. | |
| 2,411,052 | 11/1946 | Oakley | 51—125 X |
| 2,412,306 | 12/1946 | Stoll | 51—156 X |
| 2,955,389 | 10/1960 | Thebault | 51—119 |
| 3,225,492 | 12/1965 | Day | 51—157 X |

FOREIGN PATENTS 1,451,464    7/1966    France.

LESTER M. SWINGLE, Primary Examiner

D. G. KELLY, Assistant Examiner

U.S. Cl. X.R.

51—58, 230

Disclaimer 3,465,480.—*Elmer P. Hausermann*, Bensenville, Ill. APPARATUS FOR SHAPING ELECTRODES. Patent dated Sept. 9, 1969. Disclaimer filed June 10, 1971, by the inventor.

Hereby enters this disclaimer to claims 1, 2, 3 and 5 of said patent.

[*Official Gazette May 20, 1975.*]